Figure 8:
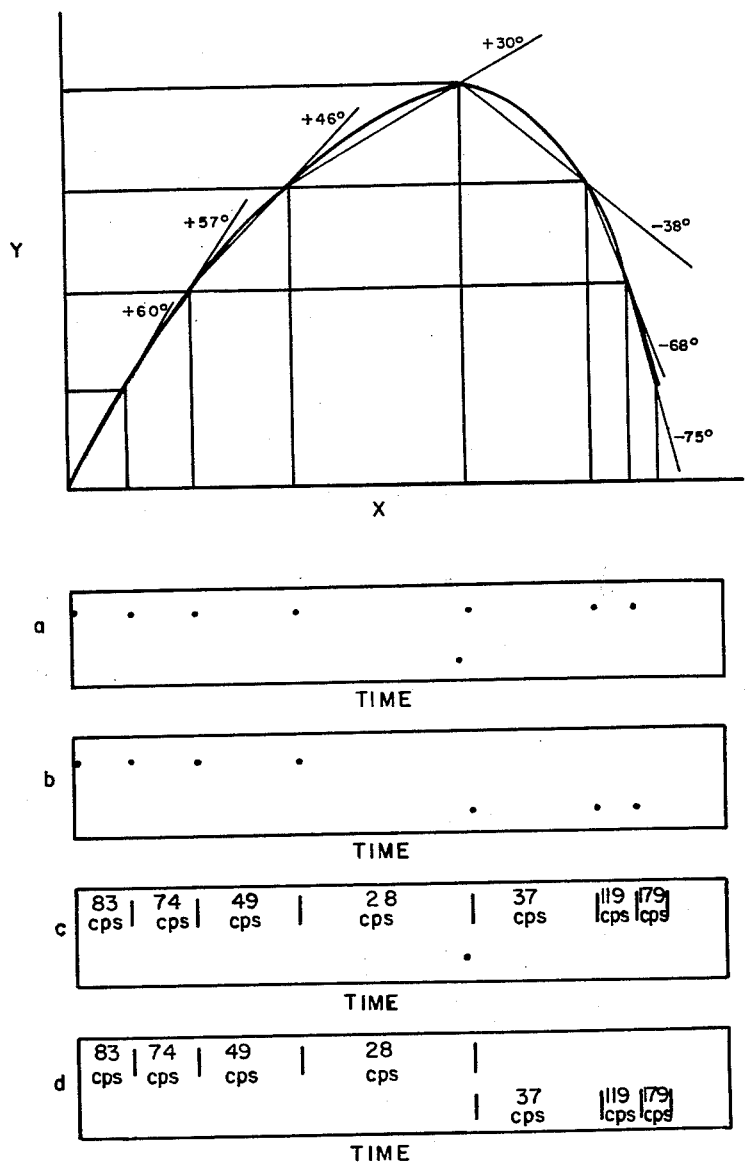

Nov. 10, 1964    J. P. WOODS ETAL    3,156,892
STORING AND REPRODUCING COORDINATE FUNCTIONS ON
FERROMAGNETIC MATERIAL FOR USE IN
CORRECTING SEISMIC RECORDS
Filed Feb. 2, 1959    11 Sheets-Sheet 1
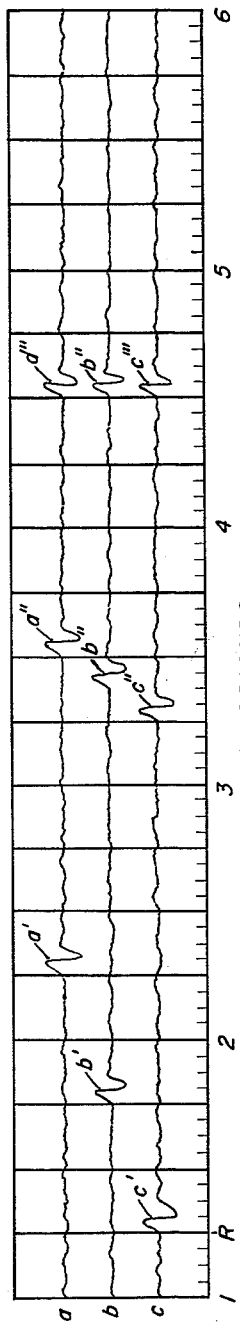
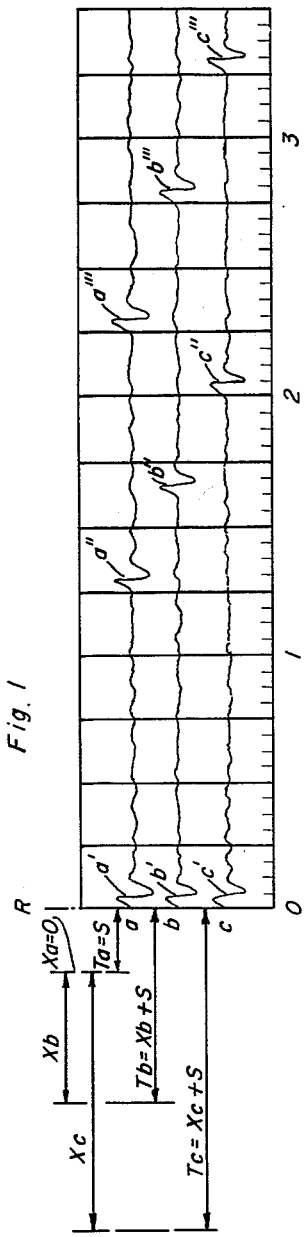
STATIC DELAYS
S  = 0.25 sec.
Xa = 0.00 sec.
Xb = 0.50 sec.
Xc = 1.00 sec.
Ta = 0.25 sec.
Tb = 0.75 sec.
Tc = 1.25 sec.
ATTEST:
Charles F. Steininger
INVENTOR.
John P. Woods
Edwin B. Neitzel
BY Clifford D. Dransfield
Norbert E. Birch
ATTORNEY

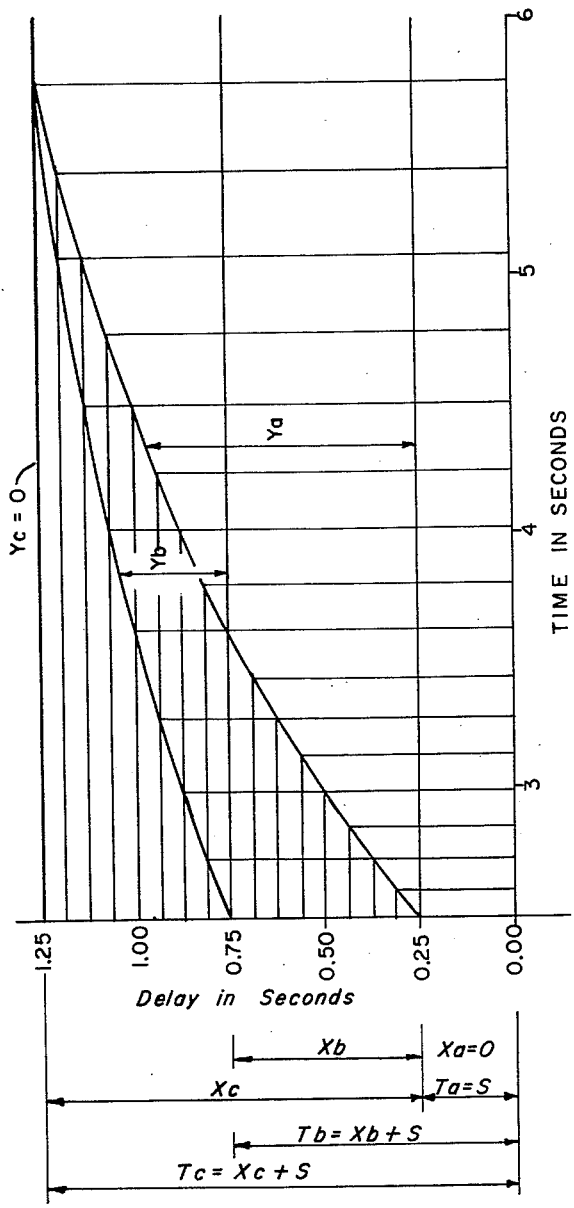
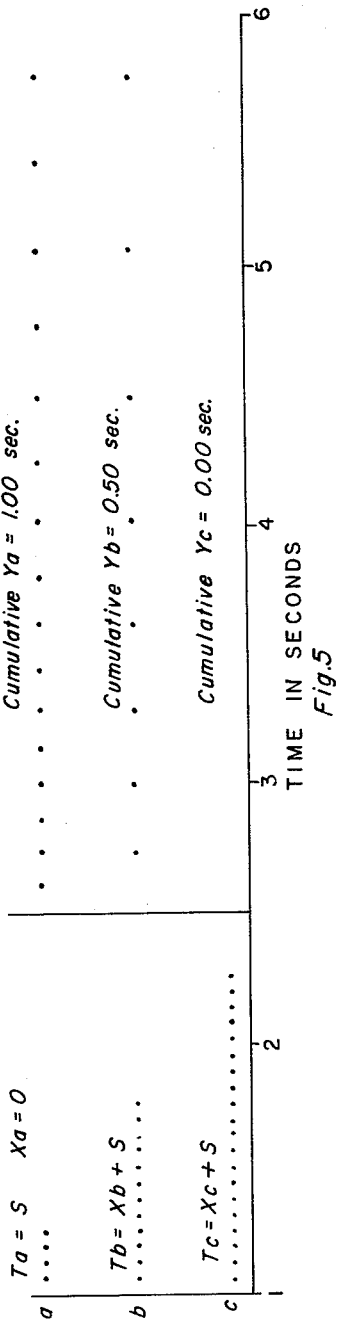

Nov. 10, 1964 J. P. WOODS ETAL 3,156,892
STORING AND REPRODUCING COORDINATE FUNCTIONS ON
FERROMAGNETIC MATERIAL FOR USE IN
CORRECTING SEISMIC RECORDS
Filed Feb. 2, 1959 11 Sheets-Sheet 3
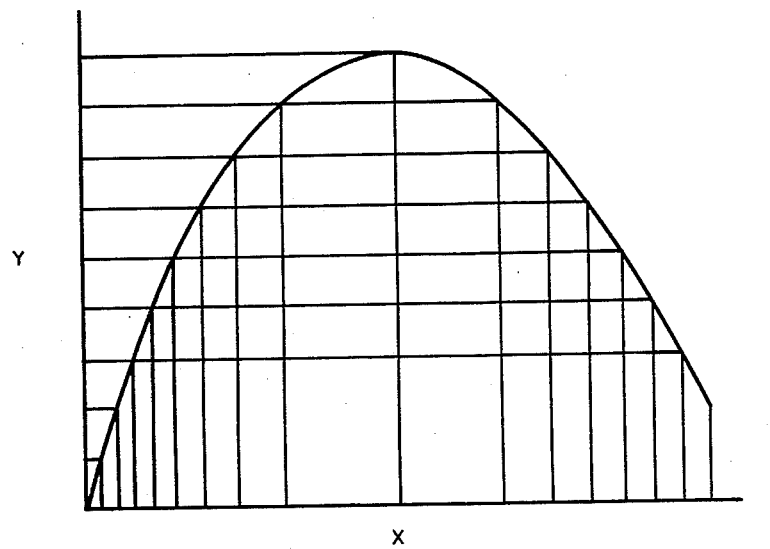
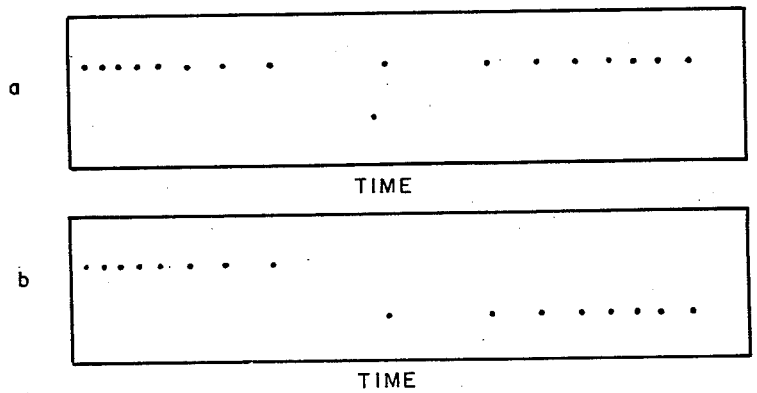
Fig. 6
ATTEST:
Charles F. Steininger
INVENTOR.
John P. Woods
Edwin B. Neitzel
BY Clifford D. Dransfield
ATTORNEY

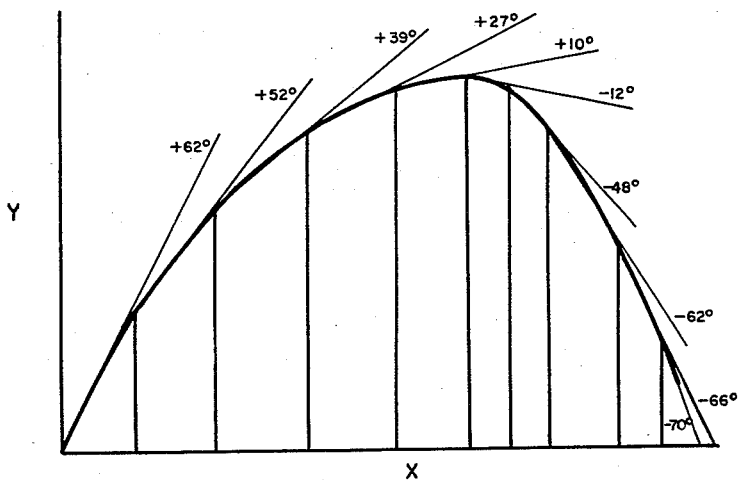
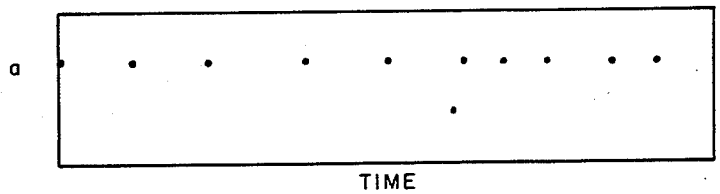
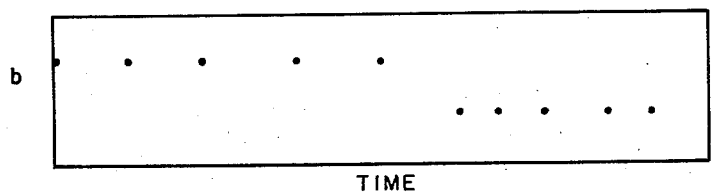
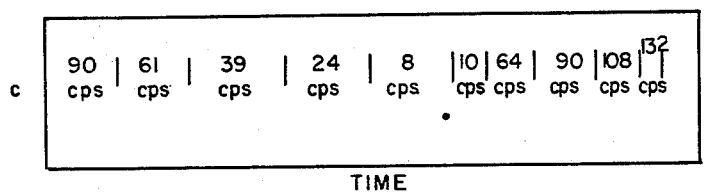
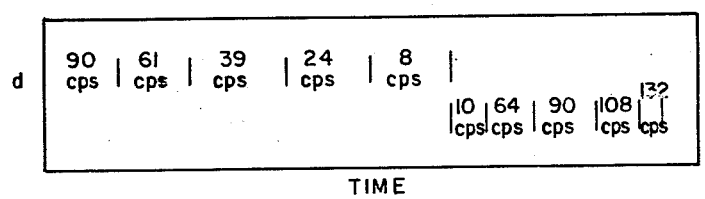
Fig.7
INVENTOR.
John P. Woods
Edwin B. Neitzel
Clifford D. Dransfield
BY
ATTORNEY INVENTOR.
John P. Woods
Edwin B. Neitzel
BY Clifford D. Dransfield

ATTORNEY 3,156,892
STORING AND REPRODUCING COORDINATE FUNCTIONS ON FERROMAGNETIC MATERIAL FOR USE IN CORRECTING SEISMIC RECORDS
John P. Woods, Edwin B. Neitzel, and Clifford D. Dransfield, Dallas, Tex., assignors to The Atlantic Refining Company, Philadelphia, Pa., a corporation of Pennsylvania
Filed Feb. 2, 1959, Ser. No. 790,631
26 Claims. (Cl. 340—15.5)

The present invention relates to a novel method and apparatus for storing and reproducing an orthogonal coordinate function. In a more specific aspect, the present invention relates to a novel method and apparatus for storing an orthogonal coordinate function on a ferromagnetic material and reproducing such function in digital or analog form. In a still more specific aspect, the present invention relates to a method and apparatus for storing and reproducing normal move-out functions useful in the correction of seismic records obtained in the practice of conventional methods of exploration for petroliferous deposits.

It has heretofore been known that orthogonal coordinate functions may be stored and reproduced by plotting such function with a conductive ink or a conductive wire, following this plot with an appropriate detector and producing an electrical signal which varies in accordance with variations in the function; or with a tapped potentiometer. Such methods and devices have several inherent drawbacks. First, the ability of a curve follower to accurately follow the plotted curve is generally subject to inaccuracies. In addition, even though the curve follower accurately follows the curve, loss of accuracy can readily occur in converting the information to a varying electrical signal and in applying this analog to the operation of other equipment. Most significant, however, particularly where it is desired to store and reproduce a large number of functions, is the fact that a function plotted in this manner requires a considerable amount of space. So far as the tapped potentiometer is concerned, this device results in a rather inaccurate straight line approximation between taps and requires constant calibration.

It is also known that an orthogonal coordinate function can be approximated by a plurality of digital values expressed in binary form or some other digital form used in the computer art and stored and reproduced in this form. However, this form of storage and reproduction requires rather complex and delicate equipment both for encoding and reading-out the stored information. In addition, this form of storage requires one storage medium to store values representing one coordinate of the function and a second storage medium to store values of the other coordinate of the function, and it is necessary to accurately correlate these two storage media.

It is, therefore, an object of the present invention to provide a simple and accurate method and apparatus for storing and reproducing orthogonal coordinate functions.

Another object of the present invention is to provide a novel method and apparatus for storing orthogonal coordinate functions which requires a minimum of storage space, is permanent in nature and is readily reproduced.

A still further object of the present invention is to provide a novel method and apparatus for storing and reproducing an orthogonal coordinate function wherein the stored information can be reproduced in analog or digital form.

Still another object of the present invention is to provide a novel method and apparatus for storing and reproducing normal move-out functions for use in the automatic correction of seismic records.

Figure 9:
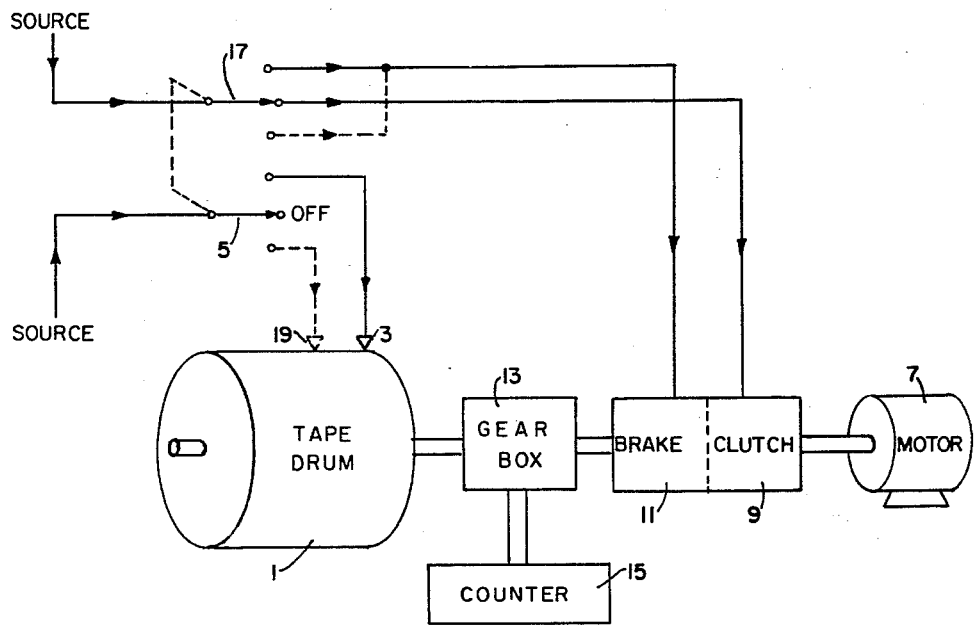
Figure 10:
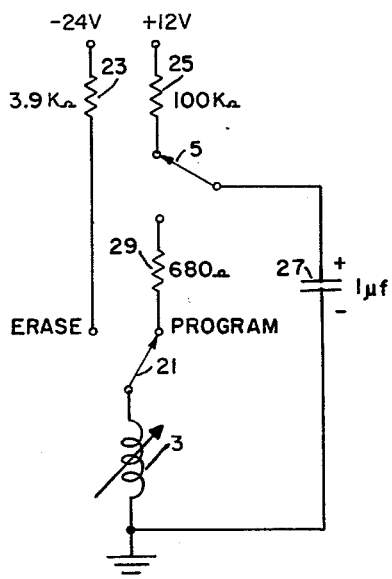
Figure 11:
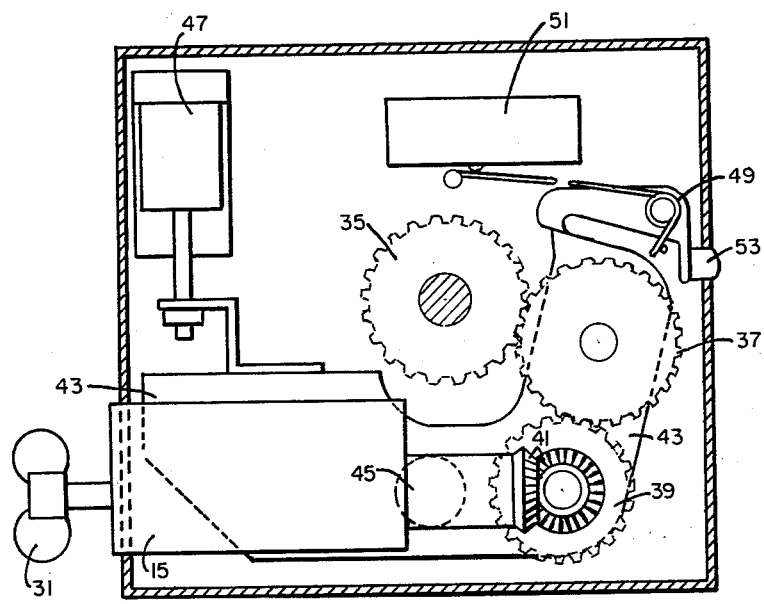
Figure 12:
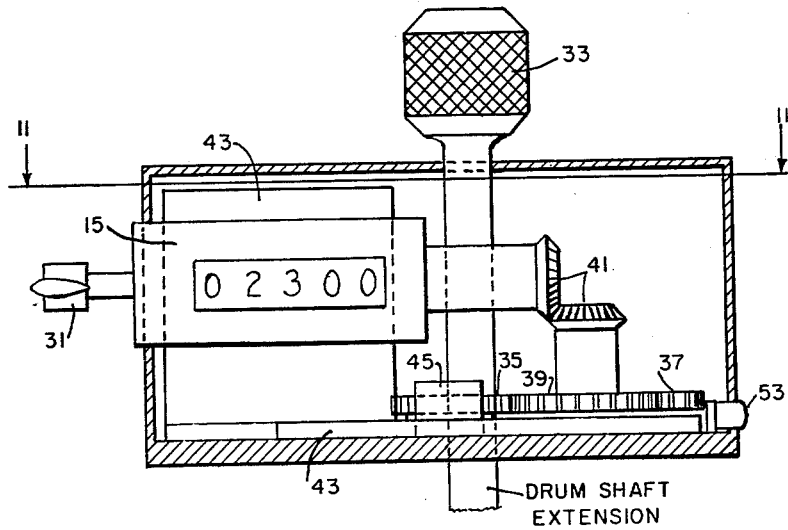
Figure 13:
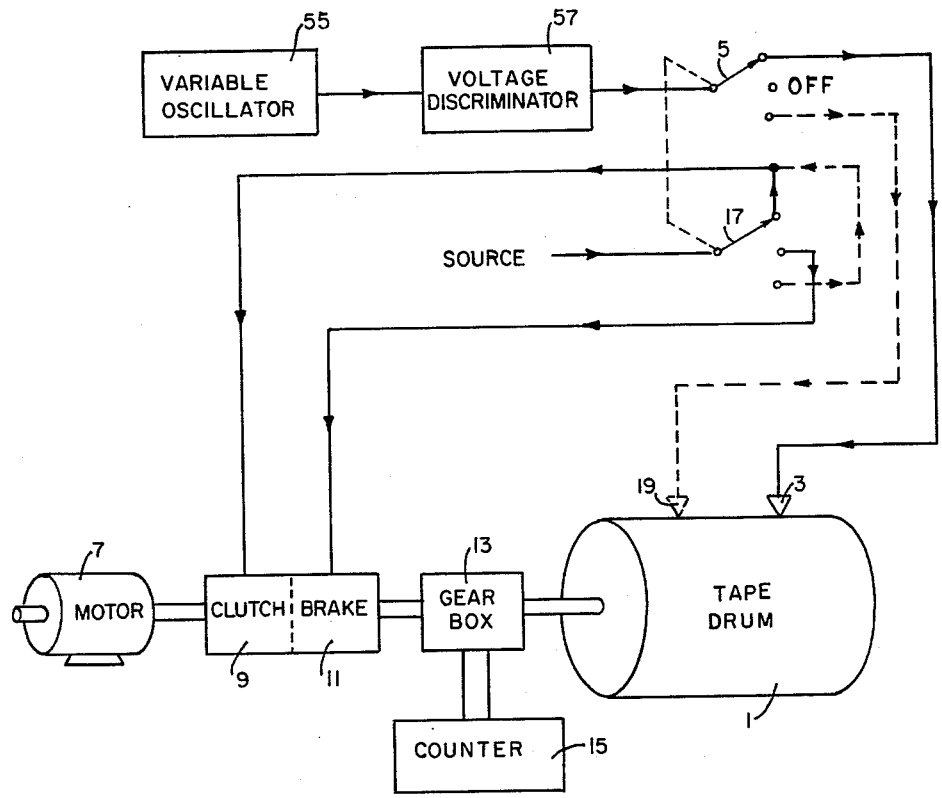
Figure 14:
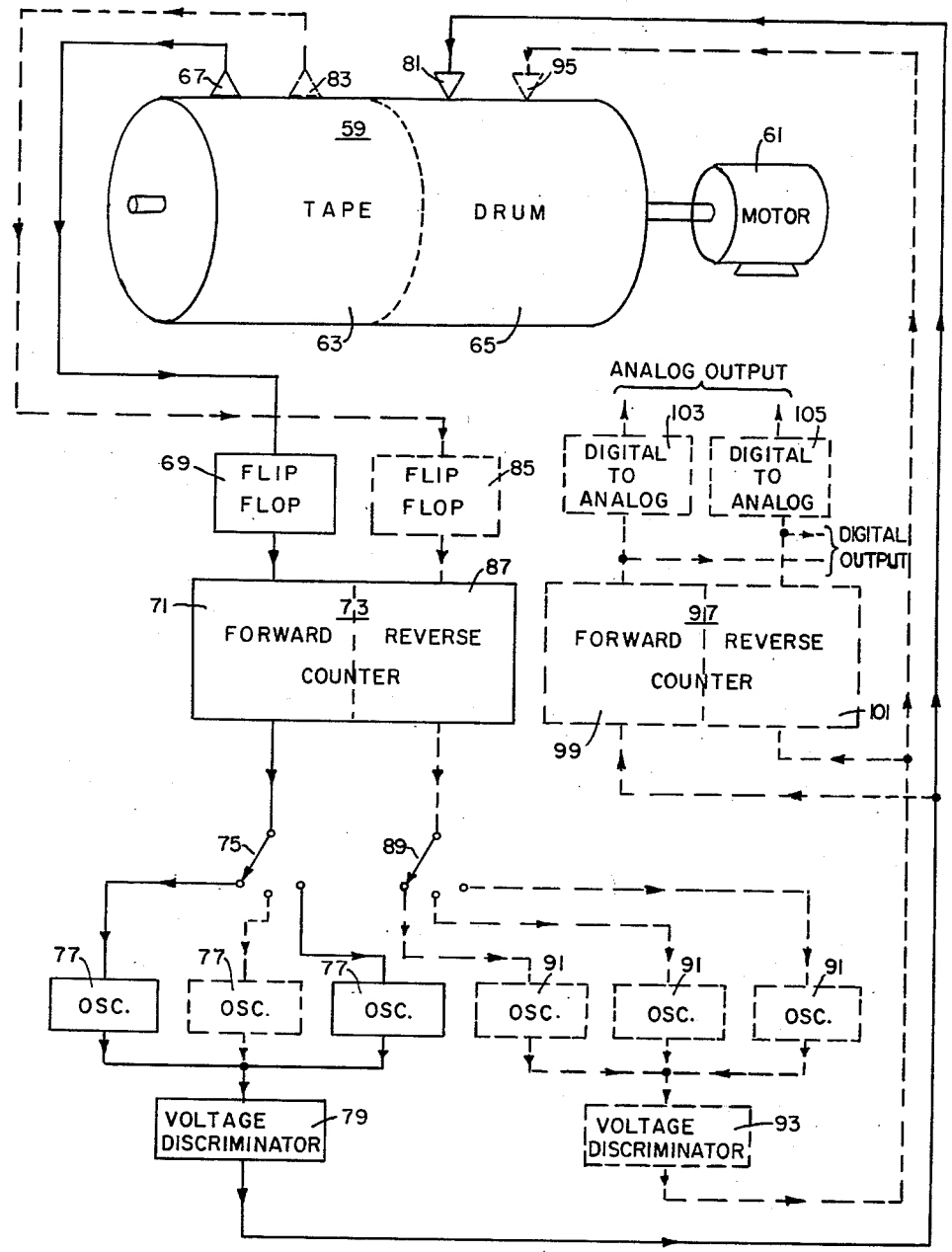
Figure 15:
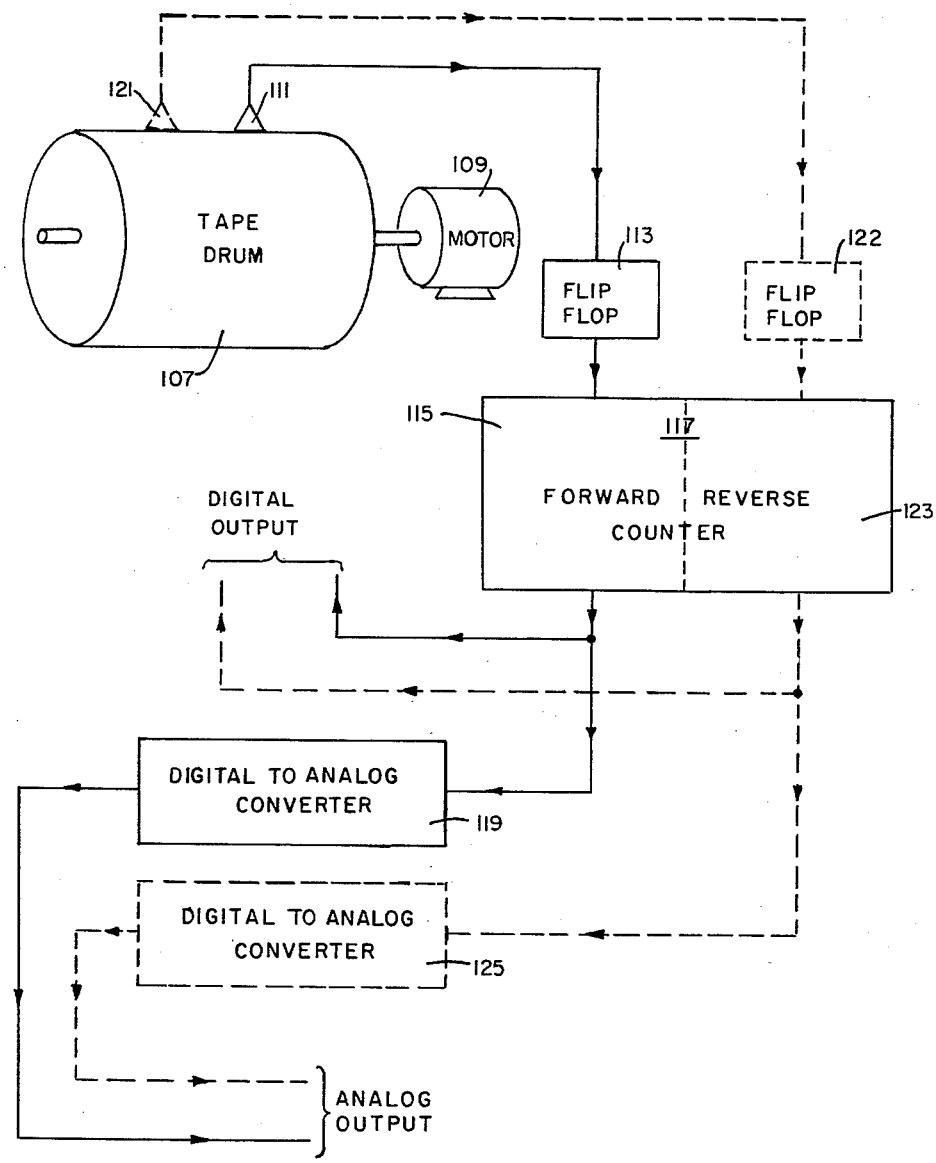
Figure 16:
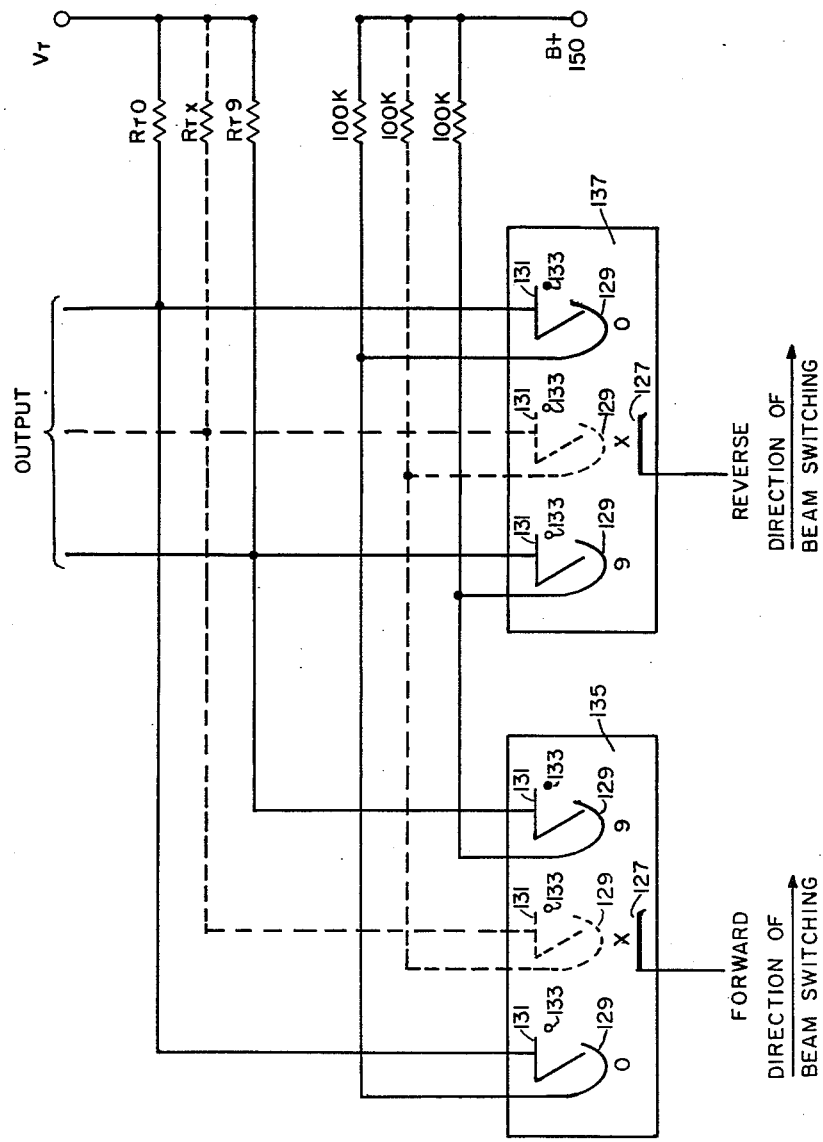

These and other objects and advantages of the present invention will be apparent from the following detailed description when read in conjunction with the acmompanying drawings, wherein:

FIGURE 1 is a draftsman's representation of a field record obtained by a conventional seismic exploration method, FIGURE 2 is a partially corrected version of the record of FIGURE 1, FIGURE 3 is a fully corrected version of the record of FIGURE 1, FIGURE 4 is a set of monotonic coordinate functions representative of one of the corrections applicable to the record of FIGURE 1, FIGURE 5 is a representation of a ferromagnetic recording medium having the functions of FIGURE 1 recorded thereon in accordance with the present invention, FIGURE 6 is a nonmonotonic coordinate function together with representations of ferromagnetic recording media illustrating one method of storing coordinate functions in accordance with the present invention, FIGURE 7 is a nonmonotonic coordinate function together with representations of a series of ferromagnetic recording media illustrating a second method of storing coordinate functions in accordance with the present invention, FIGURE 8 is a nonmonotonic coordinate function together with representations of a series of ferromagnetic recording media illustrating a third method of storing coordinate functions in accordance with the present invention, FIGURE 9 is a schematic diagram of an apparatus suitable for programming coordinate functions on ferromagnetic recording media in accordance with one variation of the present invention, FIGURE 10 is an electrical circuit diagram illustrating a means of programming coordinate functions on ferromagnetic recording media, FIGURES 11 and 12 are planned and elevational views, respectively, of a totalizing counter such as that shown in block form in FIGURE 9, FIGURE 13 is a schematic diagram of an apparatus suitable for programming coordinate functions on ferromagnetic recording media in accordance with another variation of the present invention, FIGURE 14 is a schematic diagram of an apparatus suitable for converting one form of storing coordinate functions on ferromagnetic recording media to another together with an alternate system for utilizing the converted information from the first media without rerecording, FIGURE 15 is a schematic diagram of an apparatus suitable for reading-out information representing a coordinate function on a ferromagnetic recording medium and converting the information to a digital or analog equivalent of the original function, and FIGURE 16 is a simplified circuit diagram of an automatically reversible sequential counter suitable for use in the apparati illustrated in FIGURES 14 and 15.

In accordance with the present invention, it has been found that an orthogonal coordinate function may be stored by dividing one coordinate or the function itself into predetermined increments, establishing a linear scale on a ferromagnetic recording surface proportional to one of the coordinates of the function and placing at least one magnetized spot on the recording surface at selected points along the linear scale dictated by changes in the magnitude of the function. This stored information can then be readily reproduced and supplied in analog or digital form by scanning the ferromagnetic recording medium and supplying a series of electrical pulses equivalent in number to the number of magnetic spots on the ferromagnetic medium and spaced in time in proportion to the spacing of magnetic spots along the linear scale of the ferromagnetic medium.

In order to clearly illustrate applicants' invention, and in particular the preferred field of use of applicants' invention as applied to the art of seismic exploration, reference will be made to FIGURES 1 through 5 of the drawings.

In seismic exploration generally, elastic waves are created at or adjacent to the surface of the earth by dentonating an explosive charge, by dropping a heavy weight to the surface of the earth or by other like means. These elastic waves are transmitted through the earth and at least a portion of such waves traverse downwardly through the earth and are reflected back to the earth's surface from the interfaces of subsurface strata due to discontinuities or variations in the elastic wave transmitting properties of such strata. By placing detectors or seismic pickups on or adjacent to the surface of the earth at points adjacent to or displaced from the origin of the seismic energy the arrival of the various reflected waves at the surface of the earth may be detected. These detectors convert the detected waves to equivalent electrical signals which are then amplified and recorded in a form known as a seismogram or seismic record. Such a seismic record consists of a plurality of traces arranged in parallel relationship, each representative of the output of an individual geophone or group of geophones. Such traces are plotted against a time scale supplied by one or more appropriate constant frequency timing signals which are recorded simultaneously with the recordation of the seismic traces. Obviously, significant events or reflections appearing along a given seismic trace will appear on the trace at a given time. The time at which a reflection or significant event occurs is indicative of the two-way travel time from the source of energy to the subsurface reflecting barrier and back to the detection point at the surface of the earth. By dividing this travel time by two and employing known values of the velocity of travel of elastic waves through the earth the operator may then calculate the depth of the formation of interest; and by obtaining a plurality of traces, representing a plurality of detecting stations spaced along a line pointing toward or offset from the source of energy, one may plot the subsurface formation and thus indicate the dip or attitude or other variations in depth of the formation of interest along that line. However, before the desired theoretical true depth or true travel time information can be obtained there are certain factors inherent in the seismic exploration method which affect the recorded travel times and must be taken into consideration.

To take a simplified example, if a source of energy is located at one point of the surface of the earth and three detectors or groups of detectors are laid out in a line pointing toward the source, that is to say, a detector $c$ is immediately adjacent the source, a detector $b$ is X feet away from the source, and a detector $a$ is located 2X feet away from the source, this particular arrangement of detectors will result in a record of the type illustrated in FIGURE 1, wherein traces $a$, $b$ and $c$ represent the outputs of detectors $a$, $b$ and $c$, respectively. However, the recorded travel times of the signals received at each of the detector points are in error or vary from the theoretical true travel time for various reasons, depending upon the arrangement of detectors employed and the topography and the like of the area being explored.

First, it is obvious that, if one detector is located on a hill and another in a valley, energy from the same source and reflected from the same subsurface barrier will arrive at the geophone located in the valley earlier than it will arrive at the geophone located on the hill. Accordingly, in order to obtain true travel time information one must relate both geophones and the signals received thereby to a common datum plane or horizontal reference plane. In order to do this one must either advance or delay the signals received by the geophones by amounts of time representing the distance which each geophone varies from the horizontal datum plane. In this instance the entire signal or trace may thus be shifted since each incremental portion of the trace or each pulse received by that particular geophone will be in error by the same amount. This correction is thus referred to in the art as a "static" correction since it does not vary along the length of a given trace. In the example of FIGURE 1, it is assumed that no elevation error appears in any of the traces.

Another error or variation which must be compensated for in geophysical work is that error due to the presence of the upper unconsolidated section of the earth. This is known in the art as the weathered layer and may extend from the surface to depths as great as 50 to 100 feet. Because this layer is unconsolidated, elastic waves travel through this layer at a much slower rate than they travel through the consolidated subsurface layers of the earth. Accordingly, a correction must be made on each trace of a seismic record to compensate for the excess time which it takes the waves to pass through the unconsolidated layer as opposed to their passage through consolidated formations. This error is also the same throughout the length of a seismic trace and therefore is also a static correction. In some instances where the thickness of the weathered layer is the same under each detector, the same weathering correction can be applied to each of the traces produced by each of the geophones. However, in other cases the thickness of the weathered layer may change or the velocity of travel through the weathered layer may change from detection point to detection point and individual corrections must be applied to each trace. In either event, the weathering correction may be lumped with the elevation correction for each trace to produce a composite static correction which is applied at each point along the length of an individual trace. In the example of FIGURE 1, the weathering error is assumed to be 0.25 second and is the same for all traces.

The static errors or corrections discussed thus far obviously assume that the travel paths from the source of energy to the reflecting barriers and back to the detection points at the surface of the earth are substantially vertical paths. This assumption will be true so far as a geophone $c$, located immediately adjacent the source of energy, is concerned but is not true so far as those geophones ($b$ and $a$) located finite distances away from the source of energy are concerned. In the example previously given, the elastic waves from the source to a given reflecting barrier and back to geophone $c$ will follow a vertical travel path and thus no error because of divergence from a vertical travel path will occur at any point on trace $c$. However, energy from the source to the same reflecting barrier and back to the surface at geophone $b$, spaced X feet from the source of energy will follow a slant-ray path and will thus be recorded later than the same energy reflected from the same barrier is recorded by geophone $c$. Accordingly, a correction must be applied to the trace recorded by geophone $b$ to compensate for the difference in travel time between travel time along the slant-ray path as opposed to travel time over a vertical path. Similarly, energy created at the source, reflected from the same subsurface barrier and detected by a geophone $a$, located 2X feet from the source of energy, will follow an even longer slant-ray path and thus will be in error by an even greater amount. These errors are illustrated by the fact that pulses $a'$, $b'$ and $c'$, $a''$, $b''$ and $c''$, and $a'''$, $b'''$ and $c'''$ are assumed to be received from three different horizontal barriers; but as will be explained hereinafter only pulses $a'''$, $b'''$ and $c'''$ are aligned to indicate a horizontal barrier. These errors are known in the art as normal move-out errors or those errors due to the angularity of the slant-ray paths followed by the energy and caused by the spacing of the detection points finite distances away from the source of energy. If one were interested only in a single reflecting barrier the application of a correction to compensate for the normal move-out error would be comparatively simple and one could simply add this correction to the previously discussed static corrections for each appropriate trace. However, the application of the normal move-out correction is complicated by the fact that the operator is normally interested in more than one subsurface reflecting barrier. Referring again to the example previously set forth, as the energy from the source is reflected from successively deeper reflecting barriers and back to the surface at detector $b$ (illustrated by pulses $b''$ and $b'''$), the angle of the slant-ray path traveled by the energy decreases for each successively deeper reflecting barrier and at the theoretical infinite depth this angle would be zero. Stated differently, as the distance X from the source of energy to geophone $b$ becomes smaller and smaller in comparison to the distance to a reflecting barrier the error caused by the spacing of geophone $b$ from the source of energy becomes smaller and smaller and approaches zero at the theoretical infinite depth. Thus, at great depth, $b'''$ is not in error due to normal move-out and is properly aligned with $a'''$ and $c'''$ to indicate a horizontal barrier. Accordingly, in correcting the seismic trace produced by geophone $b$, a dynamic or varying correction must be applied along the length of the trace. This correction is obviously a maximum at the beginning of the trace (for near surface reflection $b'$) and decreases toward the end of the trace until it becomes insignificant and approaches zero at the end of the trace (for reflection $b'''$ at great depth). Similarly, the error due to normal move-out which appears in the trace produced by geophone $a$, located 2X feet from the source of energy will be larger at the beginning of the trace than that for the trace produced by geophone $b$ but will also gradually decrease and approach zero toward the end of the trace.

This dyanmic or nomal move-out correction may be calculated as a function of time along the length of a seismic trace and plotted as a monotonic coordinate function or it may be expressed in terms of digital values which differ at each point in time along the length of the trace. Thus the dynamic correction may be applied to a seismic record by the use of either an analog type computer or a digital type computer. In the first instance, a plot of the normal move-out curve may be drawn in conductive ink and followed by conventional curve follower. The output of the curve follower may then be converted to a proportional voltage and employed to dynamically move a detector or a recorder as it detects or records a particular seismic trace. In the case of the digital computer, the digital values may be stored in the form of punched tape, by the use of a binary or other type coding system; read-out by a conventional punched tape reader; and applied to the seismic traces in digital form by conventional delay means, for example, by switching fixed recording or reproducing heads of a magnetic recording system as the traces are detected or rerecorded. In the first instance, the storage of the normal move-out curve requires a substantial amount of space, particularly since one must use a different curve to correct each trace of a seismic record and there are normally about 24 traces on a conventional seismic record. In addition, presently available curve followers are not sufficiently accurate to permit rigorous reproduction of the curve. The obvious drawbacks to the digital system and the use of punched tape and the like as a storage medium are inherent in the complexity of the encoding and read-out apparati required as well as the necessity of employing complicated and not too well understood coding systems.

In contrast to these prior art systems for storing and reproducing normal move-out functons, applicants' method and apparatus provide a very simple method for storing the normal move-out information. One of the main advantages is that a single track on a magentic tape can be employed to represent each normal move-out curve and all 24 normal move-out curves, necessary for the correction of the 24 trace seismic record, can be stored on a tape no larger than the magnetic tape on which the original seismic record is recorded. Another advantage inherent in applicants' method of storage is the fact that the storage tape may be placed on and played out from the same drum as carries the seismic record and thus can be accurately coordinated in time with time along the seismic record. Further, the apparati necessary to encode or record the normal move-out curves in accordance with applicants' invention and to read-out and apply the normal move-out correction is extremely simple and rugged.

Referring in detail to FIGURES 4 and 5 of the drawings and recalling the simple example previously discussed, FIGURE 4 represents a series of conventional normal move-out curves, which have been inverted as a matter of convenience, and FIGURE 5 represents a storage tape prepared in accordance with one form of applicants' invention and which is based on the curves of FIGURE 4. In FIGURES 4 and 5 the previously discussed total static corrections are expressed by the Letter S. In the example given, it has been assumed that the cumulative static corrections are equal to 0.25 second and are the same for traces $a$, $b$ and $c$.

As previously mentioned, the curves of FIGURE 4 are inverted forms of conventional normal move-out curves. The necessity of employing the inverted form of the normal move-out curve stems from the fact that in the example to be discussed it is assumed that in the seismic record corrector employed all corrections must be applied to the traces of the seismic record by means of time delays. Since it was assumed that geophone $c$ was located immediately adjacent the source of energy, this trace is displaced in time or is in error only by the amount S, or the total static error, and it is unneecssary to correct this trace for normal move-out errors. The trace recorded by geophone $b$, located X feet from the source of energy, is in error by S plus the varying or dynamic value representing the normal move-out error. Finally, the trace recorded by detector $a$ located 2X feet from the source of energy will be in error by S plus a still larger varying or dynamic value representing the normal move-out error for that trace. However, since these errors are to be compensated for by time delays, it is necessary that the corrections be applied to the traces in their reverse order. The first step in the correction procedure is to select a horizontal reference plane from which all greater depths may be calculated. In the present case we select the "first break" on the record as a reference point. This is equivalent to selecting the horizontal barrier responsible for pulses $a'$, $b'$ and $c'$ as the reference plane. The letter R is used to designate this point in the drawings. If we applied the corrections by, in effect, advancing incremental portions of the traces, as in an analog corrector, we could simply rapidly shift the pickup to R on trace $c$ and detect and rerecord trace $c$. This would remove the static error S from trace $c$ and the rerecorded trace would reflect the proper relative time positions of all incremental portions thereof with respect to R or 0 time on the new record. Thereafter, in the playout of trace $b$, pulse $b'$ would be advanced to R and each subsequent incremental portion of trace $b$ would be advanced by progressively smaller amounts, thereby aligning corresponding events on trace $b$ with those of trace $c$. Similarly, pulse $a'$ would be advanced to R and the remaining increments of trace $a$ advanced by smaller amounts. If, as assumed, we employ a digital corrector and correct by time delays, we must modify the procedure. This is accomplished by applying the largest total delay applicable to any trace to the trace having the smallest error present therein and thereafter aligning the remaining traces with this trace. In the present example, the largest total error appears in trace $a$ and this is equal to S, or 0.25 second, plus the largest normal move-out correction applicable to trace $a$ (1.00 second at the point on the trace where pulse $a'$ appears). Therefore, trace $c$ is delayed by a total of 1.25 seconds, or S (0.25 second) plus a time $Xc$ which is equal to 1.00 second. In order to align pulse $b'$ with $c'$ in its new position, we must now delay trace $b$ by 0.75 second, or S plus the largest normal move-out correction applicable to trace $b$ ($Xb=0.50$ second). Finally, trace $a$ is delayed by 0.25 second, or S plus the largest normal move-out correction aplicable to trace $c$ ($Xa=0$ second). The result of delaying the traces in this manner is illustrated by FIGURE 2. It should be observed in FIGURE 2 that, whereas pulses $a'$, $b'$ and $c'$ are properly aligned, the remaining increments of the traces (particularly pulses $a''$, $b''$ and $c''$ and $a'''$, $b'''$ and $c'''$) are not aligned properly. This stems from the fact that we have so far ignored the fact that the normal move-out errors are not constant throughout the length of the traces but, in fact, become progressively smaller. Since trace $c$ contained no normal move-out error, pulses $c'$, $c''$ and $c'''$ appear in FIGURE 2 at their proper relative time positions because we have not altered the relative time positions but have changed the time of all increments by equal amounts. However, pulses $a''$ and $a'''$ and $b''$ and $b'''$ (in fact, each incremental portion of traces $a$ and $b$ appearing subsequent to pulses $a'$ and $b'$) have not been delayed sufficient amounts of time due to the fact that we have applied the same normal move-out correction at all points along the traces and we have reversed the order of application of the corrections. This can, however, be readily taken care of if we now apply additional dynamic delays to traces $a$ and $b$ and also apply these dynamic delays in their reverse order, i.e., trace $a$, from R on, will be delayed by dynamically increasing amounts which are equivalent to the normal move-ou errors of original trace $a$ in reverse sequence and trace $b$, from R on, will be delayed by dynamicaly increasing amounts which are equivalent to the normal move-out errors of original trace $b$ in reverse sequence. Thus, the inverted normal move-out curves of FIGURE 4 represent the corrections applied. The uppermost curve of FIGURE 4 shows an initial total delay, Tc, of 1.25 seconds and no additional delays. The middle curve of FIGURE 4 shows an initial total delay 0.75 second plus additional dynamically applied delays which at any point along trace $b$ equal the cumulative value $Yb$. Finally, the lowermost curve represents an initial total delay of 0.25 second plus additional dynamically applied delays which at any point along trace $c$ equal the cumulative value $Yc$. It should be recognized, however, that the correction procedure described above is a continuous operation and that the record of FIGURE 2 will not be prepared. Instead, the corrections are all applied in the process of going from the record of FIGURE 1 to the final record of FIGURE 3.

In the process of encoding the subject corrections, the so-called static corrections are applied immediately at the beginning of a given trace and to these static corrections are added the X value of delay. These corrections are, therefore, encoded by placing on magnetic tape a plurality of closely spaced magnetic spots, each of which represents a preselected time delay. In the present instance, incremental delays of 0.0625 second have been selected. Accordingly, in FIGURE 5, an initial delay of 0.25 second is represented by four closely spaced magnetic spots on track $a$, an initial delay of 0.75 second is represented by 12 magnetic spots on track $b$, and an initial delay of 1.25 seconds is represented by 20 magnetic spots on track $c$. Thereafter, as it is necessary to introduce an additional delay of 0.0625 second above the initial delay, another spot is placed on the magnetic tape at an appropriate position in time. Thus, the dynamic delay to be applied to trace $a$ is represented by 16 magnetic spots on track $a$ which are spaced in time in accordance with the lowermost curve of FIGURE 4. Similarly, additional delays in increments of 0.0625 second are added at appropriate times along the length of trace $b$ by placing on track $b$ eight additional magnetic spots which indicate incremental additional delays of 0.0625 second. Finally, since trace $c$ has already been delayed by the maximum total amount which is applicable to any of the traces, no additional delays are required. This is illustrated by the fact that $Yc$ is zero as indicated in the figures and no additional magnetic spots are added to track $c$ of FIGURE 5.

Having thus encoded appropriate correction information on a plurality of tracks of the magnetic tape, which equal in number the number of traces of the seismic record to be corrected, it is a simple matter to read off the proper corrections at their proper points in time and simultaneously correct the seismic traces as they are detected or played out from the original seismic record. This may be accomplished by simply following the appropriate track on the storage tape with a magnetic detector and producing a series of time spaced command pulses each time a spot on the record is detected. These time spaced pulses are employed to operate an appropriate digital type counter adapted to switch a magnetic delay line in accordance with the received commands. This method of applying corrections to a seismic record is fully explained in copending application, Serial No. 761,044, assigned to a common assignee; and apparatus therefor is illustrated in FIGURE 6 of the subject application.

If, as previously mentioned, the incremental portions of the traces can be in effect advanced, the corrections are directly applied to remove the errors as they appear on each trace. The tape would, therefore, be encoded by placing thereon a plurality of magnetic spots representing the static errors appearing on the trace, and then time spaced magnetic spots would be encoded to represent incremental normal move-out errors as they appear along that trace. These stored corrections may also be read-out as above, fed to a conventional digital counting circuit, converted from digital to analog form by a conventional digital-to-analog converter and then applied in the correction of the seismic traces by an analog type seismic record corrector such as that described in copending application, Serial No. 749,190 assigned to a common assignee. One form of apparatus for applying the correction information to seismic records by the use of an analog type computer is shown in FIGURE 9 of the latter application.

It should be recognized that the errors assumed and the incremental corrections applied in the previous example are exaggerated for purposes of explanation. In actual practice, the total weathering and elevation corrections vary between typical limits of approximately 0.02 and 0.06 second and the total dynamic or normal move-out correction varies between about 0.1 and 0.5 second. Accordingly, the corrections are generally applied in increments of 0.001 second or even 0.0005 second.

The above-described method may also be employed to store and reproduce nonmonotonic coordinate functions. For example, FIGURE 6 illustrates a nonmonotonic coordinate function and ferromagnetic recording tapes $a$ and $b$ carrying stored data representing the function. Obviously, since a nonmonotonic function will change direction at least once some means must be provided on the storage medium to indicate this change in direction. As was described in the case of a monotonic function, a magnetized spot is placed on the ferromagnetic medium each time a preselected incremental change along the Y axis of the function is read off. This procedure is followed for both the increasing and decreasing values of the nonmonotonic function. Either one of two procedures may be followed to indicate a change in direction of the function, that is, a change from increasing values to decreasing values or vice versa. As shown in tape *a* of FIGURE 6, in one case the magnetized spots indicating the incremental changes in the function along the Y axis are recorded on a single track and a magnetized spot is placed on a second track at that point at which the curve reverses its direction. A second procedure which can be followed in this instance is shown in ferromagnetic tape *b* of FIGURE 6. In this instance, two separate tracks are used to record the functional values, one track containing functional values which are increasing in value and the second track representing functional values which are decreasing.

Another mode of storing coordinate functions on a ferromagnetic recording medium, in accordance with the present invention, is illustrated in FIGURE 7 of the drawings. In accordance with FIGURE 7, the function is approximated by a series of straight line segments. In the illustrated case, this is done simply by tracing over the curve a plurality of straight line segments in a manner such that the straight line segments do not depart from the curve, either above or below, by more than some preselected amount. A time base is then established on the tape proportional to the abscissa or X axis of the nonmonotonic coordinate function. Information representing the function can then be placed on magnetic tape by one of two basic methods. In the first method, as illustrated by tapes *a* and *b*, a magnetic spot is placed on the tape each time a change in the slope of the segments occurs. As will be explained hereinafter, tapes prepared in this manner may be employed directly or may be employed in the preparation of a second tape similar to that illustrated by tapes *c* and *d* of FIGURE 7. Tapes *c* and *d* may also be prepared directly from the function. In this case, a variable oscillator is adjusted to produce an output whose frequency over a period of time is proportional to the slope of the segment of the curve in question. As illustrated in the drawing, the variable oscillator would first be set to produce an output signal at a frequency of 90 cycles per second or some other proportional frequency representing the 62 degree slope of the first straight line segment approximating the function. At the end of the first straight line segment, the oscillator is again adjusted so as to produce an output signal having a frequency of 61 cycles per second which is representative of the slope of the second straight line segment of the curve. Similarly, the remaining straight line segments are represented by signals having a frequency proportional to the slope of that segment. The oscillator output is converted to a plurality of pulses by means of a conventional voltage discriminator. The output of the voltage discriminator is then applied to a magnetic recording head which places a plurality of magnetic spots on the tape equal in number to the number of pulses produced by the discriminator and whose repetitive rate is proportional to the frequency of the oscillator and is representative of the slope of a particular segment of the function.

Other procedures for approximating the function of FIGURE 7 by a series of straight line segments will be obvious to those skilled in the art. For example, a plurality of straight lines tangent to the curve may be drawn, a plurality of straight lines dividing the curve into small sectors may be drawn, or in some cases the curve itself may be divided into segments of equal length and a plurality of straight lines drawn through the curve connecting the adjacent division points. In any of these cases, the two basic methods of representing the function on magnetic tape illustrated by tapes *a* and *b* or tapes *c* and *d* may be employed.

Still another mode of storing a coordinate function, in accordance with the present invention, is illustrated in FIGURE 8 of the drawings. The method illustrated by FIGURE 8 is actually a combination of the methods illustrated in FIGURES 6 and 7. In accordance with FIGURE 8, one ordinate of the coordinate function is divided into equal segments representing preselected, incremental changes in the value of the selected ordinate. A plurality of straight lines are then drawn along the curve spanning the individual segments. Thereafter, as in FIGURE 7, information representing the function is placed on a ferromagnetic recording medium either by placing a magnetic spot on the tape each time a change in the slope of the plurality of straight lines occurs or a plurality of magnetic spots are placed on the tape having a constant frequency proportional to the slope of each straight line segment.

Obviously, in all of the cases illustrated thus far, the preselected increments which represent changes in magnitude or changes in slope will result in a closer approximation of the curve if these segments are made as small as possible. Therefore, it is to be recognized that the segments shown in the drawings are larger than one would normally select, and as a result divergence from the actual curve is much greater than is necessary or desirable. In addition, although all of the figures show the abscissa as being proportional to the time base established along the tape, it is obvious that the time base on the tape may be made proportional to the ordinate in many cases.

*Programming*

Both monotonic and nonmonotonic functions may be programmed on a ferromagnetic recording medium by a simple hand operated or semi-automatic devices such as that shown in FIGURE 9 of the drawings. For example, in preparing a tape in accordance with FIGURES 4 and 5 of the drawings, a tape of proper length is mounted on a rotatable drum 1. A recording head 3 is mounted in a fixed position relative to the drum, and a pulsing key, or switch 5, is placed in the power supply line to head 3. Drum 1 may be rotated by motor 7 through a combination clutch and brake mechanism 9 and 11, respectively, and a gear box 13. A mechanical totalizing counter 15 is coupled to the drum drive through gear box 13. The counting mechanism of counter 15 is coordinated with the time scale established along the length of the tape. For example, each digit on counter 15 can be made to represent 0.001 second of time along the tape. Switch 17 is ganged to switch 5 and is designed to connect or disconnect a power source to clutch 9 and brake 11 as appropriate.

In operation, with counter 15 at zero and head 3 positioned on the tape at a zero time reference, switches 5 and 17 are positioned to make contact with their central contacts. With the switches in this position, no power is supplied to recording head 3 and no power is supplied to the drum braking mechanism 11. However, power is supplied to actuate clutch 9 thereby coupling drum 1 to motor 7. Drum 1 is rotated at a slow rate until a preselected time, as indicated by the reading of counter 15, is reached on the tape. This preselected time represents the first point in time along the time base at which an incremental amount of time delay is to be indicated on the tape for later application to the correction of a seismic record as indicated in the tapes of FIGURE 5. When this point in time is reached, switches 5 and 17 are flipped to their uppermost positions thereby disengaging clutch 9 and applying brake 11 to stop rotation of the drum and, at the same time, passing power through switch 5 to head 3 to place a pulse on the tape. Switches 5 and 17 are then flipped to their center position and this same procedure is repeated as each individual incremental delay is programmed on the tape.

This same programming apparatus can be employed to prepare tapes for nonmonotonic functions as illustrated by tapes *a* and *b* of FIGURES 6, 7 and 8 of the drawings. In this instance, a second magnetic recording head 19 is fixedly mounted adjacent drum 1 to record a second information track and appropriate third contacts are added to switches 5 and 17. The programming procedure would, of course, be exactly the same as that followed in the previous example except that the operator would select the proper recording head in accordance with the illustrations of tapes *a* and *b* of FIGURES 6, 7 and 8.

FIGURE 10 of the drawings presents a simplified diagram of the electrical portion of the programmer of FIGURE 9. Switch 21 is a single-pole double-throw switch designed to be switched either to an erase position or a program position as shown. In the beginning of the programming operation, switch 21 is thrown to the erase position. In this position, current will flow from a negative power source through resistor 23 and thence to recording head 3. The recording drum is then rotated one complete revolution, and the ferromagnetic medium is thus placed in negative saturation. Thereafter, with head 3 aligned with the zero reference line on the tape and counter 15 set to its zero position, switch 21 in turned to its program position. In the meantime, switch 5 has been in its uppermost position, and current from a positive source has been passing through resistor 25 and pulsing switch 5 to charge capacitor 27. When the drum is in position for the recordation of a magnetic spot, as previously described, pulsing switch 5 is flipped to its lowermost position thereby discharging capacitor 27 through resistor 29 and switch 21 and passing current to head 3 to drive the magnetic recording medium to positive saturation for the width of one pulse. Switch 5 is then released and assumes its uppermost position thereby again charging capacitor 27. After the drum has been rotated to the next position where a magnetic spot is to be placed on the tape, pulsing switch 5 is again turned to its lowermost position thereby recording a second magnetic spot on the recording medium by means of recording head 3. This procedure is repeated until the entire track of pulses has been recorded.

Obviously, where two tracks of information are to be recorded, as in certain of the variations heretofore described, two circuits including separate recording heads could be employed or an appropriate switch could be added to the circuit shown to alternately pass current to one or the other of two recording heads.

FIGURES 11 and 12 are detailed plan and elevational views, respectively, of the preferred form of counter 15 and its associated mechanical and electrical components. In the preferred programming operation, particularly that employed for programming normal move-out curves to be used in the correction of seismic records, it is best to prepare the program tape on the same drum from which it is to be detected or played out. Obviously, it is also most desirable that the program tape drum be mounted on the same shaft or be coupled to the shafts carrying the seismic field record drum and the final plotting drum. Since, during correction and replotting of seismic traces, all these drums are rotated at speeds greater than that desired in preparing the program tape, it is most desirable to turn the program drum by hand rather than by means of the main drive motor. This will also permit the operator to accurately "inch" the drum along to the predetermined positions along the time base of the program tape at which the magnetic spot is to be placed and obviously eliminates the necessity of supplying an additional slow speed motor and accurate switching mechanisms for programming. However, in order to prevent accidental starting of the driving motor and overspeeding of the counter to destruction, counter 15 must be provided with certain safety features as illustrated in FIGURES 11 and 12. In accordance with FIGURES 11 and 12, counter 15 is a conventional totalizing counter such as those manufactured by the Veeder-Root Company for use as totalizers on gasoline dispensing pumps and the like. Counter 15 is provided with a spring-loaded reset nob 31 which is normally biased out of engagement with the numbered disks but may be employed to reset the numbered disks by overcoming the force of the biasing spring. Nob 33 is connected to an extension of the drum shaft and carries gear 35. By turning nob 33 the drum may be manually revolved to a desired position. When the drum is revolved by means of nob 33, the counter 15 is operated through idler gear 37 which engages gear 35, gear 39 which engages gear 37, and bevel gears 41. In order to prevent operation of the counter when the main driving motor is operating, counter 15 and gears 37, 39 and 41 are mounted on sector 43 (spring-biased in the position illustrated) which pivots on pivot 45. If the drum motor is switched on, a solenoid 47 is actuated. Energization of solenoid 47 turns sector 43 on pivot 45 and rocks idler gear 37 out of engagement with gear 35. At the same time, spring-loaded pawl 49 engages sector 43 and positively holds the sector in that position with gears 35 and 37 out of engagement. Also when pawl 49 falls in position to lock on sector 43, microswitch 51 is disengaged breaking the circuit to solenoid 47 and preventing the solenoid from overheating. Re-engagement of the counter with the drum shaft can only be attained by releasing pawl 49 by pushing release button 53. When this is done, sector 43 returns to its normal position thereby re-engaging gear 35 and idler gear 37.

The alternate form of apparatus shown in FIGURE 13 would be used for the direct preparation of tapes such as tapes *c* and *d* of FIGURES 7 and 8. The apparatus of FIGURE 13 is quite similar to that of FIGURE 9 and corresponding numbers have been employed to designate corresponding elements in both figures. As previously mentioned, tapes *c* and *d* of FIGURES 7 and 8 are prepared by setting a variable oscillator 55 at different frequencies dependent upon the slope of the straight line segments employed to approximate the coordinate function. Thus, a particular constant frequency is set into variable oscillator 55 for each straight line segment, and this output is maintained for an appropriate length of time along the time base of the magnetic tape. The output of variable oscillator 55 is fed to a voltage discriminator, sometimes referred to as a "Schmitt Trigger," which converts the oscillator output signal to a series of time-spaced pulses which are spaced in time in proportion to the frequency of the oscillator output. In the operation of the apparatus of FIGURE 13 for programming the coordinate function of FIGURE 7, variable oscillator 55 would first be set at 90 cycles per second with switches 5 and 17 on their central contacts, recording head 3 positioned at the zero reference line on the tape and counter 15 set at zero. Switches 5 and 17 are then turned to their uppermost positions thereby releasing brake 11, energizing clutch 9 and passing pulses from voltage discriminator 57 to recording head 3. Recording head 3 will then record a series of pulses equally spaced in time in accordance with the output frequency of oscillator 55. When counter 15 registers the cut-off time for the first segment, switches 5 and 17 are flipped back to their central contacts thereby releasing clutch 9, applying brake 11 and disconnecting recording head 3 from the output of voltage discriminator 57. Variable oscillator 55 is then set at a frequency of 61 cycles per second, switches 5 and 17 turned to their uppermost position and a series of magnetic spots are recorded at 61 cycles per second for the appropriate period representative of the second segment of the coordinate function. This procedure is repeated as illustrated in FIGURE 7 until the entire tape has been programmed. Head 19 and the lowermost contacts of switches 5 and 17 are obviously provided to record a second track of information in accordance with tapes *d* of FIGURES 7 and 8. Although not shown, head 19 could be connected to an exterior power source adapted to place a magnetic spot on the tape each time the coordinate function changes direction as illustrated by tapes *c* of FIGURES 7 and 8.

Tapes prepared as illustrated by tapes *a* and *b* of FIGURES 7 and 8 may be employed as preliminary storage tapes and converted to tapes of the character of tapes *c* and *d* of FIGURES 7 and 8 by the apparatus illustrated in FIGURE 14. In FIGURE 14, a tape drum 59 is rotated by motor 61 and is divided into tape sections 63 and 65. Section 63 of drum 59 carries a programmed tape such as tapes *a* and *b* of FIGURES 7 and 8 and section 65 carries a blank tape. Magnetic detector 67 is fixedly mounted adjacent section 63 of drum 59 and is adapted to follow one track of the programmed tape. The pulses detected on the programmed tape by head 67 are fed to flip-flop 69 which sharpens the detected pulses. Pulses from flip-flop 69 operate the forward counting section 71 of sequential counter 73. Section 71 of counter 73 is preferably a decade counter, such as the "Magnetron Beam Switching Tube" manufactured by the Burroughs Corporation, or a plurality of decade counters connected by appropriate tens transfer means. Section 71 of counter 73 sequentially counts the pulses received from flip-flop 69 and the output of the counter is connected to an appropriate multicontact switch 75. The contacts of multicontact switch 75 are connected to an equivalent number of oscillators 77 which are preset at different frequencies. As commanded by the count of counter 73, switch 75 turns on a proper one of the oscillators 77. Alternatively, oscillators 77 may be run continuously and switch 75 may be used to connect the proper oscillator into the circuit. The output of each oscillator 77 is a constant frequency signal which is fed to a voltage discriminator 79. Voltage discriminator 79 converts the oscillator signal to a series of time-spaced pulses whose frequency of repetition is proportional to the frequency of the oscillator output. The output from voltage discriminator 79 is passed to recording head 81 which records a plurality of time-spaced magnetic spots on a track of the tape carried by section 65 of drum 59. Detector head 83, flip-flop 85, reverse counting section 87 of counter 73, multicontact switch 89, oscillators 91, voltage discriminator 93 and recording head 95 correspond to the previously described elements and are, of course, adapted to record a second track of information where this form of programming is employed to store a nonmonotonic function.

*Reading Out Stored Information*

Continuing the discussion of FIGURE 14 and referring specifically to the alternative outputs of voltage discriminators 79 and 93, it is clear that information stored as illustrated by tapes *a* and *b* of FIGURES 7 and 8 may be used directly to produce a digital or analog output. In this variation, the storage tape would be scanned by receiving heads 67 and 83 as previously described. After passing through the previously described conversion system, the outputs of voltage discriminators 79 and 93 would be fed to another counter 97 which is divided into forward counting section 99 and reverse counting section 101. If the pulses from voltage discriminator 79 and 93 are not sufficiently sharp to operate counter 97, it may be necessary to insert flip-flops or other pulse sharpening circuits between the voltage discriminator and counter. The output of counter 97 may be employed directly as a digital output to perform various switching or other functions. Alternatively, the digital outputs of counter 97 may be passed to digital-to-analog converters 103 and 105, respectively, and a voltage will be produced which is an analog of the original coordinate function. This analog output can, of course, be used in various well known manners to operate appropriate equipment.

FIGURE 15 is an illustration of the simple read-out mechanism which can be employed to read out information stored in accordance with tapes *a* and *b* of FIGURES 6, 7 and 8. In this apparatus, the storage tape is mounted on drum 107 which is rotated by motor 109. Magnetic receiving head 111 is fixedly mounted adjacent drum 107 and follows the information track on the tape. The output of head 111 is fed to flip-flop 113 where the pulses are sharpened. The output of flip-flop 113 passes to forward counting section 115 of counter 117 where the pulses are sequentially counted. The digital output of section 115 of counter 117 may be employed directly to operate an appropriate apparatus. Such an apparatus is shown in FIGURE 6 of copending application Serial No. 761,044 where the digital output is employed to switch an appropriate magnetic delay line through which seismic signals are fed and simultaneously corrected. Alternatively, the output of counting section 115 of counter 117 may be fed to a digital-to-analog converter 119 to produce an analog output. This analog output can be employed to operate appropriate apparati, such as the apparatus of FIGURE 9 of copending application Serial No. 749,190 which employs an analog signal to dynamically correct seismic traces as they are detected from the original seismic record. Magnetic receiving head 121 is appropriately mounted adjacent drum 107 to follow a second information track such as that illustrated in tapes *b* of FIGURES 6, 7 and 8. The output of head 121 is fed to reverse counting section 123 of counter 117 through flip-flop 122. As previously mentioned, the output of counter 117 may be used directly in digital form or this output may be fed to digital-to-analog converter 125. The output of converter 125 would, accordingly, be combined with the output of converter 119 to produce an analog signal equivalent to the original nonmonotonic function.

As previously suggested, read-out of a nonmonotonic function stored in accordance with the present invention may be accomplished by detecting the magnetic spots on the storage medium, producing a series of time-spaced pulses, converting these pulses to square wave pulses and operating an automatically reversible sequence counter therewith.

A simplifier circuit for a reversing counter suitable for use in accordance with the present invention is shown in FIGURE 16. This reversing counter makes use of at least one sequential switching tube in each section, such as the "Magnetron Beam Switching Tube" manufactured by the Burroughs Corporation.

In order to clearly understand the operation of the circuit of FIGURE 16, it will be best to briefly review the construction and operation of the Magnetron Beam Switching Tube. This beam switching tube is a ten-position, high-vacuum, constant current distributor. The tube consists of ten identical "arrays" located radially about a central cathode 127. Each array includes a spade 129 which automatically forms and locks the electron beam, a target output 131 which makes the beam current available with constant current characteristics and a high impedance switching grid 133 which serves to switch the beam from target to target. A small cylindrical magnet is permanently attached to the glass envelope of the tube to provide a magnetic field which, in conjunction with an applied electric field, comprise the crossed fields necessary for the operation of the tube.

The spade electrodes directly affect the magnitude and shape of the electron beam in the area between the cathode and the spades. The tube will always be in the cut-off state when power is first applied if there are no provisions for beam forming. The spades are commonly connected to their supply voltage through individual series load resistors. When all of the spades are at B+ potential, the tube is equivalent to a magnetron diode in the cut-off condition, since the magnetic field prevents any electrons from reaching the outer arrays. The beam may be formed in any one of its ten "on" positions by sufficiently lowering the potential on the respective spade with either a D.C. voltage or a high speed pulse. Each spade has a negative resistance characteristic due to the crossed electric and magnetic fields. When the spade potential is lowered to approximately 60 percent of the spade B+, the negative characteristic will provide automatic lock-in at a point near zero or cathode potential. Thus, the one spade which forms and locks the beam is near cathode potential while the remaining ones are at B+. The beam is slightly curved in a clockwise direction as a result of the radius of curvature of the electrons determined by the combination of electric and magnetic fields.

When a beam has been formed on a spade, it can remain there indefinitely, or it can be advanced in several ways. One method is by lowering the switching grid voltage to a value where it will change the electric field in the area between spades so that enough of the electron beam is diverted to the leading spade to cause that spade voltage to be lowered and assume its locked-in stable state. Because of their shape and position, a negative voltage or pulse applied to the grid electrodes will effect a very fast and uniform switching. The fixed polarity of the magnetic field determines the direction of sequential switching which is normally clockwise. In each position, a beam is effected only by the individual grid with which it is associated. The grids are connected in two groups, the odd numbered grids in one group and the even numbered in the other. Thus, it is possible to use a D.C. input in pushpull fashion (flip-flop) to secure single position stepping.

As previously stated, the beam switching tube is capable of switching only in one direction and reversing the switching in a single tube is impossible. FIGURE 16 shows a simplified circuit using at least one tube 135 for forward counting and at least one other tube 137 for reverse counting, even though both tubes are actually switching in their normal clockwise direction. As illustrated in FIGURE 16, the reverse counting tube 137 is switching in its normal direction, but we simply reverse the numbering sequence on the arrays of this tube and interconnect the reverse counting tube 137 with the forward counting tube 135 so that they can be automatically changed from forward counting to reverse counting or vice versa. As shown in FIGURE 16, the spades 129 representing the zero count on tubes 135 and 137, respectively, are tied together so that both will be at the same potential at all times. Similarly, the spades of the number 9 positions of both tubes are tied together, and the spades of the intermediate positions, such as the $x$ position, are similarly tied together. Simiarly, correspondingly numbered plates, such as 0—0, 9—9 and $x$—$x$ are tied together, and the output of the overall system will be that of the particular plate which is energized at a given time. The cathodes 127 are interconnected through a directional flip-flop (not shown) so that one of the two tubes is on at all times and power is alternately supplied to one or the other on command.

In operation, we will first refer specifically to forward counting tube 135 and initial formation of the beam on the zero position of that tube. First a command to the directional flip-flop (not shown) energizes or turns on cathode 127 of tube 135. Thereafter, the beam is formed on the zero position by lowering the potential of zero spade 129, as by shorting this spade out to ground. At this point, the beam will be formed on the zero position of tube 135 and will remain in that position indefinitely unless conditions are changed. In addition, the zero position spade of tube 137 is also at the lowered potential but no beam is formed in tube 137 since this tube is in its off condition. In order to effect switching, the grids 133 ahead of the zero position grid (in the direction of switching) are rapidly pulsed in sequence until they reach the desired forward count position, such as position 9 of tube 135. As this sequential pulsing of the grid electrodes takes place, the beam is diverted to the leading spade ($x$ then 9) to cause the spade voltage to be lowered and lock the beam in that position. With the beam on the 9 position of tube 135 and spade 129 of that position lowered, the potential of the spade at the number 9 position of tube 137 is also at this lowered potential. If we now want to start counting in the reverse direction, from 9 downwardly, a command is sent to the directional flip-flop (not shown) which will turn the cathode 127 of tube 135 off and the cathode 127 of tube 137 on.

Since the spade of the 9 position of tube 137 is at the lowered potential, the beam will form in this position. Thereafter, the downward count or switching (9 to $x$ to 0) is accomplished in the same manner as the forward count. Obviously, the output of the circuit at any given instant will be the output of the particular plate of the array on which the beam is formed at that instant, and its character is determined by the particular tube from which the output is obtained at that instant.

Having described the present invention, it is to be understood that the examples given and the apparati and methods illustrated in the drawings are for illustrative purposes only and that modifications and equivalents of the same will be obvious to one skilled in the art without departing from the present invention.

We claim:

1. A method of storing a coordinate function, comprising dividing said function into a plurality of preselected increments, each of which represents a change in the magnitude of said function as represented along one coordinate of said function, establishing a linear scale of physical distance along a ferromagnetic recording medium proportional to the other coordinate of said function, moving said recording medium relative to at least one magnetic recording element while simultaneously accumulating the distance traveled by said recording element along said linear scale, and placing at least one magnetic spot on said recording medium at each of those cumulative distances along said linear scale of physical distance at which each of said increments occurs.

2. A method in accordance with claim 1 wherein the preselected increments represent equal changes in the magnitude of the function along the first coordinate.

3. A method in accordance with claim 2 wherein a single magnetic spot is employed to represent each change in magnitude.

4. A method in accordance with claim 1 wherein the function is a monotonic function and the cumulative number of magnetic spots at any one point along the linear scale is proportional to the magnitude of the function at said point.

5. A method in accordance with claim 1 wherein the function is a nonmonotonic function and the recording medium is moved relative to two laterally spaced recording elements.

6. A method in accordance with claim 5 wherein a magnetic spot is placed on the recording medium by one of the recording elements at that point at which a change in direction of the function occurs.

7. The method in accordance with claim 5 wherein one of the recording elements is employed to record magnetic spots as the function changes continuously in one direction and the other recording element is employed to record magnetic spots when the function is changing in the opposite direction.

8. The method in accordance with claim 1 wherein the preselected increments are represented by straight line segments approximating the direction of the function.

9. The method in accordance with claim 8 wherein the straight line segments connect sections of the function of equal length.

10. The method in accordance with claim 9 wherein each of the straight line segments depart from the function by a maximum preselected amount.

11. The method in accordance with claim 9 wherein the straight line segements are lines drawn tangent to the function.

12. The method in accordance with claim 9 wherein a single magnetic spot is placed on the recording medium at the beginning of each straight line segment.

13. The method in accordance with claim 12 wherein the recorded magnetic spots are detected and employed to vary the output frequency of an oscillator means in accordance with the slope of each straight line segment and magnetic spots proportional in frequency to the outputs of the oscillator means are sequentially recorded on a second recording medium.

14. The method in accordance with claim 8 wherein a plurality of equally spaced magnetic spots proportional in frequency to the slope of each straight line segment is placed on the recording medium between those cumulative distances along the linear scale spanned by said straight line segments.

15. A method in accordance with claim 1 wherein the magnetic spots are detected, and the detected pulses are converted to a digital output.

16. A method in accordance with claim 1 wherein the magnetic spots are detected, and the detected pulses are converted to an analog output.

17. A method for applying normal move-out corrections represented as a coordinate function, to a seismic signal comprising dividing said function into a plurality of preselected increments, each of which represents a change in the magnitude of said function as represented along one coordinate of said function, establishing a linear scale of physical distance along a ferromagnetic recording medium proportional to the other coordinate of said function and the length of said seismic signal, moving said recording medium relative to at least one magnetic recording element while simultaneously accumulating the distance traveled by said recording element along said linear scale, placing at least one magnetic spot on said recording medium at each of those cumulative distances along said linear scale at which each of said increments occurs, moving said ferromagnetic recording medium relative to a magnetic reproducing element, detecting said magnetic spots by means of said reproducing element and changing the relative positions of appropriate incremental portions of said seismic signal as dictated by the cumulative distances along said linear scale at which each of said magnetic spots appears.

18. A method in accordance with claim 17 wherein the preselected increments of the function represent equal changes in the magnitude of said function along the first coordinate of said function.

19. A method in accordance with claim 17 wherein the preselected increments represent preselected delays to be applied to appropriate incremental portions of the seismic signal.

20. A method in accordance with claim 19 wherein the magnetic spots representing delays are utilized to switch a magnetic delay line through which the seismic signal is being passed.

21. A method in accordance with claim 17 wherein the detected magnetic spots are converted to an analog signal and said analog signal is employed to change the position of appropriate incremental portions of the seismic signal during the transfer of said seismic signal from one location to another.

22. Apparatus for recording a coordinate function on a ferromagnetic recording medium comprising a magnetic recording element positioned adjacent said ferromagnetic recording medium, means for moving said recording medium relative to said recording element operatively engaging said recording medium, counter and visual indicating means for accumulating and indicating the cumulative distance moved by said recording medium relative to said recording element, a source of power adapted to vary the magnetization of said recording medium at preselected spots, and switch means electrically connecting said recording element directly to said source of power and adapted to momentarily pass power to said recording element and produce a single magnetized spot on said recording medium each time said switch means is operated.

23. Apparatus in accordance with claim 22 wherein the counter and visual indicating means is a totalizing decade-type counter.

24. Apparatus in accordance with claim 22 wherein the switch means is a hand-operated pulsing switch.

25. Apparatus for reproducing a coordinate function stored on a ferromagnetic recording medium as a plurality of spaced magnetic spots, each representing equal units of magnitude of said function and placed along a linear scale of physical distance on said recording medium, comprising a magnetic reproducing element mounted adjacent said recording medium, means for moving said recording medium relative to said reproducing element operatively engaging said recording medium, counting means connected to the output of said reproducing element for continuously and cumulatively counting pulses produced by said reproducing element, and means connected to the output of said counting means for converting said counted pulses to a digital output.

26. Apparatus for reproducing a coordinate function stored on a ferromagnetic recording medium as a plurality of spaced magnetic spots, each representing equal units of magnitude of said function and placed along a linear scale of physical distance on said recording medium, comprising a magnetic reproducing element mounted adjacent said recording medium, means for moving said recording medium relative to said reproducing element operatively engaging said recording medium, counting means connected to the output of said reproducing element for continuously and cumulatively counting pulses produced by said reproducing element, and means connected to the output of said counting means for converting said detected and counted pulses to a voltage which is an analog of the original coordinate function.

References Cited in the file of this patent

UNITED STATES PATENTS

| | | |
|---|---|---|
| 2,674,732 | Robbins | Apr. 6, 1954 |
| 2,771,596 | Bellamy | Nov. 20, 1956 |
| 2,886,243 | Sprague et al. | May 12, 1959 |
| 2,907,021 | Woods | Sept. 29, 1959 |
| 2,968,022 | Unterberger | Jan. 10, 1961 |

UNITED STATES PATENT OFFICE
CERTIFICATE OF CORRECTION

Patent No. 3,156,892                                    November 10, 1964

John P. Woods et al.

It is hereby certified that error appears in the above numbered patent requiring correction and that the said Letters Patent should read as corrected below.

Column 2, lines 3 and 4, for "acmompanying" read -- accompanying --; column 7, line 42, for "move-ou" read -- move-out --; column 11, line 18, for "in" read -- is --; column 16, lines 65, 68 and 71, for the claim reference numeral "9", each occurrence, read -- 8 --; same column 16, line 69, for "segements" read -- segments --; column 18, line 7, after "indicating means" insert -- connected to said means for moving said recording medium --.

Signed and sealed this 6th day of April 1965.

(SEAL)
Attest:

ERNEST W. SWIDER                                    EDWARD J. BRENNER
Attesting Officer                                         Commissioner of Patents

UNITED STATES PATENT OFFICE
CERTIFICATE OF CORRECTION

Patent No. 3,156,892                                         November 10, 1964

John P. Woods et al.

It is hereby certified that error appears in the above numbered patent requiring correction and that the said Letters Patent should read as corrected below.

Column 2, lines 3 and 4, for "acmompanying" read -- accompanying --; column 7, line 42, for "move-ou" read -- move-out --; column 11, line 18, for "in" read -- is --; column 16, lines 65, 68 and 71, for the claim reference numeral "9", each occurrence, read -- 8 --; same column 16, line 69, for "segements" read -- segments --; column 18, line 7, after "indicating means" insert -- connected to said means for moving said recording medium --.

Signed and sealed this 6th day of April 1965.

(SEAL)
Attest:

ERNEST W. SWIDER                                      EDWARD J. BRENNER
Attesting Officer                                          Commissioner of Patents